United States Patent [19]

Baker et al.

[11] Patent Number: 5,256,296

[45] Date of Patent: Oct. 26, 1993

[54] MEMBRANE PROCESS AND APPARATUS FOR REMOVING A COMPONENT FROM A FLUID STREAM

[75] Inventors: Richard W. Baker, Palo Alto; Johannes G. Wijmans, Menlo Park, both of Calif.

[73] Assignee: Membrane Technology & Research, Menlo Park, Calif.

[21] Appl. No.: 943,923

[22] Filed: Sep. 11, 1992

Related U.S. Application Data

[63] Continuation-in-part of Ser. No. 803,109, Dec. 5, 1991, Pat. No. 5,147,550, which is a continuation-in-part of Ser. No. 635,919, Dec. 28, 1990, Pat. No. 5,071,451.

[51] Int. Cl.⁵ .............................................. B01D 53/22
[52] U.S. Cl. ........................................ 210/640; 95/45; 96/9; 96/10; 210/321.6
[58] Field of Search .................... 55/16, 23, 68, 158, 55/267–269; 210/640, 321.6

[56] References Cited

U.S. PATENT DOCUMENTS

| | | |
|---|---|---|
| 4,239,507 | 12/1980 | Benoit et al. ............................ 55/16 |
| 4,386,944 | 6/1983 | Kimura .................................... 55/16 |
| 4,553,983 | 11/1985 | Baker ...................................... 55/16 |
| 4,906,256 | 3/1990 | Baker et al. ............................. 55/16 |
| 4,952,751 | 8/1990 | Blume et al. ...................... 210/640 X |
| 4,994,094 | 2/1991 | Behling et al. ......................... 55/16 |
| 5,030,356 | 7/1991 | Blume et al. ......................... 210/640 |
| 5,032,148 | 7/1991 | Baker et al. ............................. 55/16 |
| 5,069,686 | 12/1991 | Baker et al. ............................. 55/16 |
| 5,071,451 | 12/1991 | Wijmans .................................. 55/16 |
| 5,089,033 | 2/1992 | Wijmans .................................. 55/16 |
| 5,129,921 | 7/1992 | Baker et al. ............................. 55/16 |
| 5,147,550 | 9/1992 | Wijmans et al. ..................... 210/640 |
| 5,151,190 | 9/1992 | Seiryo ................................. 210/640 |
| 5,169,533 | 12/1992 | Baker et al. ......................... 210/640 |

Primary Examiner—Robert Spitzer
Attorney, Agent, or Firm—J. Farrant

[57] ABSTRACT

A membrane separation process and system for removing a component from a fluid stream. An auxiliary membrane module or set of modules is installed across the pump that drives the main membrane unit, so that the permeate streams from the main and auxiliary membrane units are mixed and pass together through a common driving pump. The concentration of the mixed permeate stream is allowed to build up by circulating the stream through the auxiliary unit. When the concentration has reached a desired level, the mixed stream can be tapped and the product stream drawn off.

24 Claims, 5 Drawing Sheets

MEMBRANE PROCESS AND APPARATUS FOR REMOVING A COMPONENT FROM A FLUID STREAM

This application is a continuation-in-part of U.S. patent application Ser. No. 803,109, "Membrane Process and Apparatus for Removing A Component from A Fluid Stream", filed Dec. 5, 1991, now U.S. Pat. No. 5,147,550, issued Sep. 15, 1992, which is a continuation-in-part of U.S. patent application Ser. No. 635,919, "Membrane Process and Apparatus for Removing Vapors from Gas Streams", filed Dec. 28, 1990, U.S. Pat. No. 5,071,451, issued Dec. 10, 1991. The contents of both parent applications are incorporated herein by reference in their entirety.

BACKGROUND OF THE INVENTION

Vapor Separation

Gas streams containing condensable vapors, such as water vapor, sulfur dioxide, ammonia or organic vapors, arise from numerous industrial and commercial processes. One method of removing the vapor from the gas stream is by means of a membrane separation step, followed by condensation of the vapor-enriched stream from the membrane separation step.

A typical membrane vapor separation system includes a membrane unit, a pump for lowering the pressure on the permeate side of the membrane, and a condenser for liquefying the vapor. The vapor concentration in the condenser vent gas after the condensation step depends on the vapor/liquid equilibrium at the operating conditions under which the condensation is performed. It is frequently the case that the condenser vent gas contains a much higher concentration of vapor than the original feed gas. The vent gas is often recirculated to the feed side of the membrane unit for further treatment.

There are several problems associated with returning the condenser vent gas to the membrane feed. First, the more concentrated is the vent gas compared with the feed gas, the less efficient the system becomes. Suppose, for example, the feed gas contains 2% vapor, the vapor-enriched stream from the membrane separation step contains 20% vapor, and the vent gas from the condenser contains 10% vapor. Then about half of the amount of vapor removed and concentrated by the membrane is recirculated to the front of the membrane. Much of the separation achieved by membrane is then negated, resulting in increased membrane area and pump capacity requirements for the system.

What can be done to handle the condenser vent gas stream is to pass it to a second membrane stage. This stage can be designed to produce a discharge stream with a concentration about the same as the original feed, so as to minimize the impact of the recycled stream on the total process. The vapor-enriched stream from the second membrane stage is in turn condensed, and the vent gas from the second condenser is returned to the feed of the second membrane unit. Such an arrangement is shown, for example, in U.S. Pat. No. 4,906,256, FIG. 3. A two-stage system is complex compared with a one-stage, uses more controls and is more costly, since two sets of most components are needed.

Pervaporation

The discussion above concerns separations in which the feed to the membrane system is a gas or vapor. However, a similar situation obtains when components are removed from liquid streams by pervaporation. In pervaporation, the liquefied permeate may be subjected to recovery or further purification, by decantation, distillation, solvent extraction or adsorption, for example, and the impure, non-product stream from the decanter or other recovery unit may be passed to the feed side of the pervaporation unit for further treatment. Mixing the non-product stream from the recovery unit with the raw, incoming feed solution can give rise to problems similar to those discussed above for gas or vapor separation.

Gas Separation

Membrane separation systems are used for a number of gas treatment applications. In applications where the goal is to produce an enriched permeate product, a two-stage system is often required to achieve a high product concentration. The residue, or reject, stream from the second membrane stage is usually returned to the inlet of the first stage. Thus, the second stage is analogous to the recovery unit in parent applications Ser. No. 635,919, now U.S. Pat. No. 5,071,451, and Ser. No. 803,109, now U.S. Pat. No. 5,147,550, that is, it is analogous to the condenser in the vapor embodiments, or the decanter in the pervaporation embodiments. If the residue stream from the second membrane stage is very concentrated compared with the incoming feed stream to the first stage, similar problems to those described for vapor separation and pervaporation occur, and the membrane area and pump capacity of the first stage are adversely affected. Furthermore, in some situations, the inclusion of a second stage adds unacceptable complexity and cost to the system.

SUMMARY OF THE INVENTION

The invention relates to an improved and advantageous arrangement of membrane modules that allows better performance of gas, vapor or liquid separation systems.

The invention employs the same principle as that recognized in parent applications Ser. No. 635,919, now U.S. Pat. No. 5,071,451, and Ser. No. 803,109, now U.S. Pat. No. 5,147,550. These applications dealt with membrane vapor separation or pervaporation systems incorporating a main membrane separation unit, a pump or other unit to provide a driving force for membrane permeation, and a recovery unit for removing product from the permeate stream exiting the driving means. The invention involved installing a small auxiliary membrane unit across the driving and recovery units, thereby balancing the concentrations of the incoming and recycle streams and improving the efficiency of the one-stage system, as well as achieving some of the advantages of a two-stage system without adding a second stage.

The present invention relies on the same concept, namely that of adding one or more auxiliary membrane modules to enhance the performance of the main unit. The present invention differs from the inventions claimed in the parent applications in that the auxiliary modules are not mounted across a recovery unit, but simply across the pump or other means for driving the main membrane unit. The result is that the permeate streams from the main and auxiliary membrane units are mixed and pass together through a common driving unit. The concentration of the mixed permeate stream is allowed to build up by circulating the stream through the auxiliary unit. When the concentration has reached a desired level, the mixed stream can be tapped and a portion drawn off as the product stream.

Using the arrangement of the invention can achieve substantial improvements in the performance and efficiency of a conventional one-stage membrane separation system, without the necessity of resorting to a two-stage system, with attendant complications and cost. Furthermore, recovery of a product of a desired composition can be achieved without the need for either a full second membrane stage or a recovery unit.

This invention is particularly useful in gas separation, where it can be used to achieve a high product concentration without using additional vacuum pumps or compressors, and in pervaporation applications in which the product stream does not phase separate, where the auxiliary unit is used to build up the concentration of the product stream to a target level.

It is to be understood that the above summary and the following detailed description are intended to explain and illustrate the invention without restricting its scope.

DETAILED DESCRIPTION OF THE INVENTION

Vapor Separation

In the process of the invention, a feed gas stream containing a vapor is passed through a membrane separation step and a recovery step. For convenience, the figures and their descriptions show a recovery step achieved by condensation of the vapor. However, other recovery steps, including various kinds of extraction, absorption and adsorption steps are also within the scope of the invention. The vapor may be of an organic compound or mixture of compounds, such as a hydrocarbon, a halogenated hydrocarbon or the like, or an inorganic compound, such as water, sulfur dioxide, ammonia, etc. The other component or components of the feed gas stream may be other vapors, nitrogen, air or any other gas.

Figure 1:
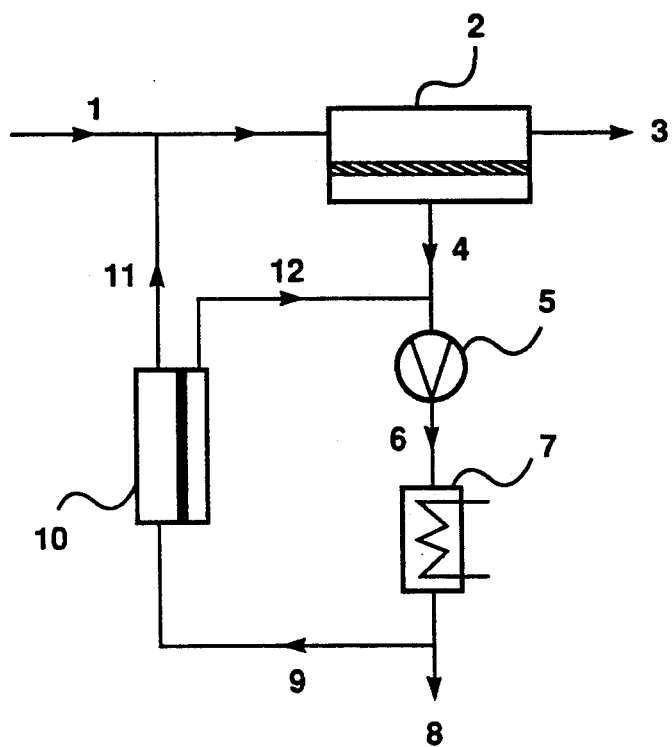
FIG. 1 is a schematic drawing showing a membrane separation process carried out with a system including a main membrane unit, a pump, a condenser and an auxiliary membrane module or modules.

A basic embodiment of the invention is shown in FIG. 1. Referring to this figure, a vapor-containing feed gas stream, 1, passes to a membrane separation unit, 2, containing one or more membranes. The membrane separation step normally involves running the feed gas stream across a membrane that is selectively permeable to the vapor that is to be removed. The vapor is concentrated in the stream, 4, permeating the membrane; the residue, non-permeating, stream, 3, is correspondingly depleted in vapor.

The membrane may take the form of a homogeneous membrane, a membrane incorporating a gel or liquid layer, or any other form known in the art. Two types of membrane are preferred for use in vapor separation embodiments of the invention. The first is a composite membrane comprising a microporous support, onto which the permselective layer is deposited as an ultrathin coating. Composite membranes are preferred when a rubbery polymer is used as the permselective material. The second is an asymmetric membrane in which the thin, dense skin of the asymmetric membrane is the permselective layer. Both composite and asymmetric membranes are known in the art. The form in which the membranes are used in the invention is not critical. They may be used, for example, as flat sheets or discs, coated hollow fibers, spiral-wound modules, or any other convenient form.

The driving force for membrane permeation is the pressure difference between the feed and permeate sides. The pressure drop across the membrane can be achieved by pressurizing the feed, by evacuating the permeate or by both. In FIG. 1, the feed gas is supplied to the membrane separation unit at atmospheric pressure or slightly above, and a vacuum pump, 5, is used to lower the pressure on the permeate side.

Stream, 6, from the vacuum pump is subjected to a condensation step. In general, the condensation step may involve chilling, compression or a combination of these. In FIG. 1, the vapor-enriched stream passes without compression to condenser, 7. The condenser may be water cooled, or may employ refrigerants that can take the gas down to lower temperatures, and produces a stream, 8, of liquified vapor.

The amount of vapor that can be removed from the vapor-enriched stream by condensation depends on the vapor concentration, the vapor/liquid equilibrium and the operating conditions under which the condensation is performed. In practice, the economics of achieving extremely high pressures and extremely low temperatures usually limit the performance of the condensation step in recovering liquified vapor. There are also constraints on the removal or recovery achieved by the other types of removal processes.

The non-condensed gas fraction, 9, emerging from the condenser contains a higher vapor concentration than the feed gas, and may contain a concentration as high as five times, 10 times or more than the feed concentration. This condenser vent gas is passed through an auxiliary membrane module or modules, 10, which, like the main membrane separation unit, normally contains a vapor-selective membrane. The volume of the condenser vent gas stream is much smaller than that of the feed gas stream, so the membrane area required for the auxiliary module is small compared with the main unit. The auxiliary module, 10, is connected on its permeate side upstream of the vacuum pump, 5. Thus the driving force for auxiliary membrane permeation is provided by the pressure difference between the vacuum and exhaust sides of the vacuum pump. The concentrated vapor stream, 12, from the auxiliary module joins with vapor-enriched stream, 4, from the main membrane unit and passes again through the vacuum pump and condenser. The residue stream, 11, from the auxiliary unit is recirculated to the feed side of the main membrane unit. The concentration of vapor in the stream 11 depends on the membrane area contained in the auxiliary module. Preferably, the membrane area is such that there is not a big difference between the vapor concentrations in streams 11 and 1. Most preferably, stream 11 should have a concentration about the same as stream 1.

Figure 2:
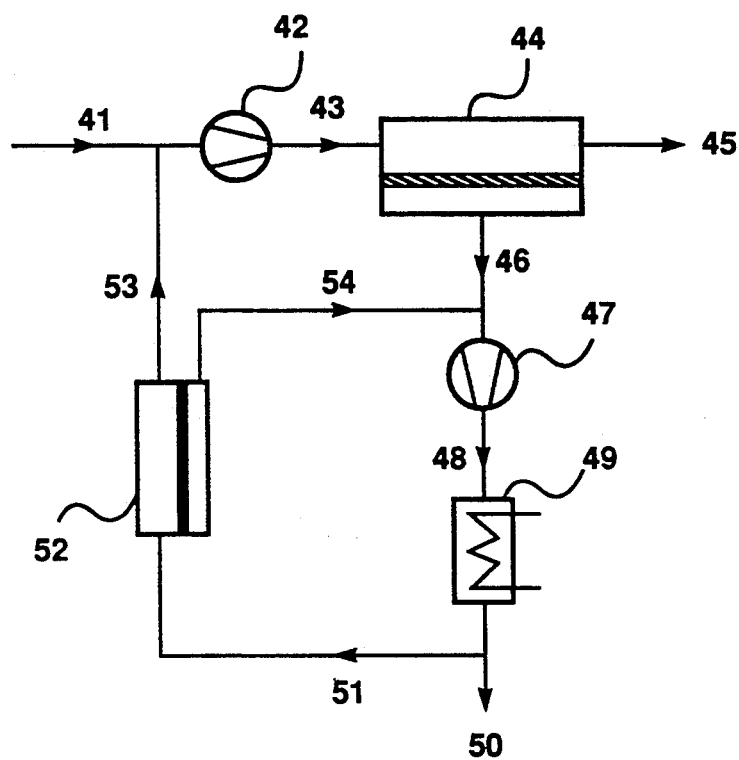
FIG. 2 is a schematic drawing showing a membrane separation process carried out with a system including a compressor, a main membrane unit, a condenser and an auxiliary membrane module or modules.

An alternative embodiment of the invention is shown in FIG. 2. This arrangement differs from that of FIG. 1 in that the feed gas stream is supplied to the main membrane unit at high pressure, so it is possible to operate at atmospheric pressure on the permeate side. Referring now to FIG. 2, a vapor-containing feed gas stream, 41, passes to a compressor, 42. Preferably, this raises the feed gas pressure to a value in the range 1-20 atmospheres. Pressurized feed gas stream, 43, then passes to membrane separation unit, 44, containing one or more membranes. The vapor is concentrated in stream, 46, permeating the membrane; the residue, non-permeating, stream, 45, is correspondingly depleted in vapor.

In this case, the driving force for membrane permeation is provided by the pressurized feed; the permeate side of the membrane is at, or close to, atmospheric pressure. Stream, 46, from the membrane passes to compressor, 47, emerging as pressurized stream, 48. It is then condensed in condenser, 49, and produces a stream, 50, of liquified vapor.

The non-condensed gas fraction, 51, is passed through an auxiliary membrane module or modules, 52, connected on its permeate side upstream of compressor, 47. The driving force for auxiliary membrane permeation is provided by the pressure difference between the pressurized exhaust from the condenser and the low-pressure side of the compressor. The concentrated vapor stream, 54, from the auxiliary module joins with vapor-enriched stream, 46, from the main membrane unit and passes again through the compressor and condenser. The residue stream, 53, from the auxiliary unit is recirculated to the feed side of the main membrane unit. The concentration of vapor in stream 53 may be tailored as discussed above.

From the above discussion it may be seen that various ways of providing the driving force for membrane permeation in the main and auxiliary membrane units are possible within the scope of the invention. What is required is that there be some component or set of components on the permeate side of the main membrane unit that changes the pressure of the gas stream passing through it, such as any type of pump, compressor, eductor or the like. What is further required is that at least part of the pressure change caused by that component or components is tapped to provide the driving means for the auxiliary module(s).

FIGS. 1 and 2 show a one-stage main membrane unit. However, it will be apparent that the same principle can be applied where the main membrane unit includes multiple membrane stages or steps, such as a two-step system, a two-stage system or other combinations.

Pervaporation

Figure 3:
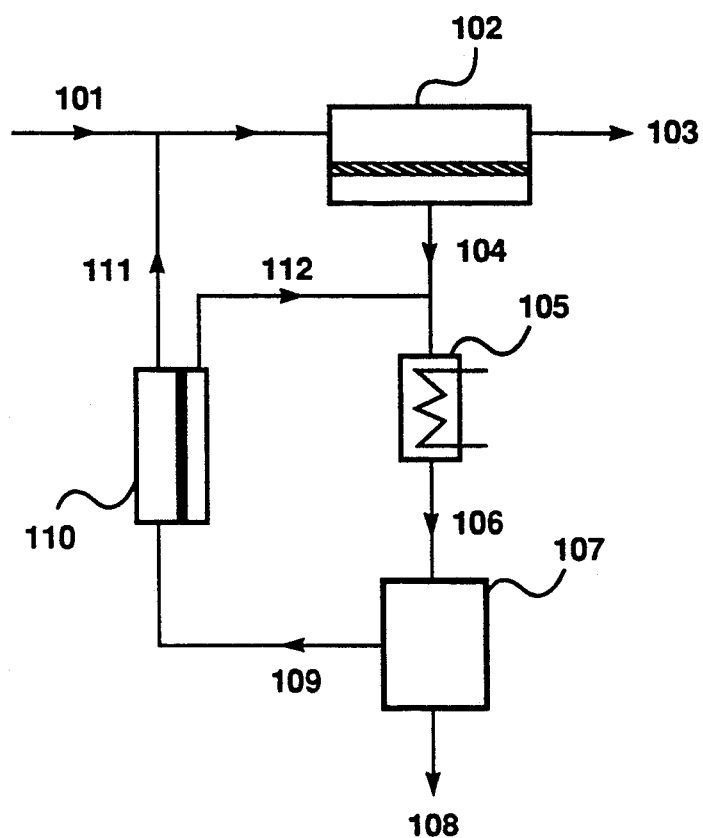
FIG. 3 is a schematic drawing showing a pervaporation/purification process carried out with a system including a main pervaporation unit, a condenser, a recovery or further purification unit and an auxiliary membrane module or modules.
Figure 4:
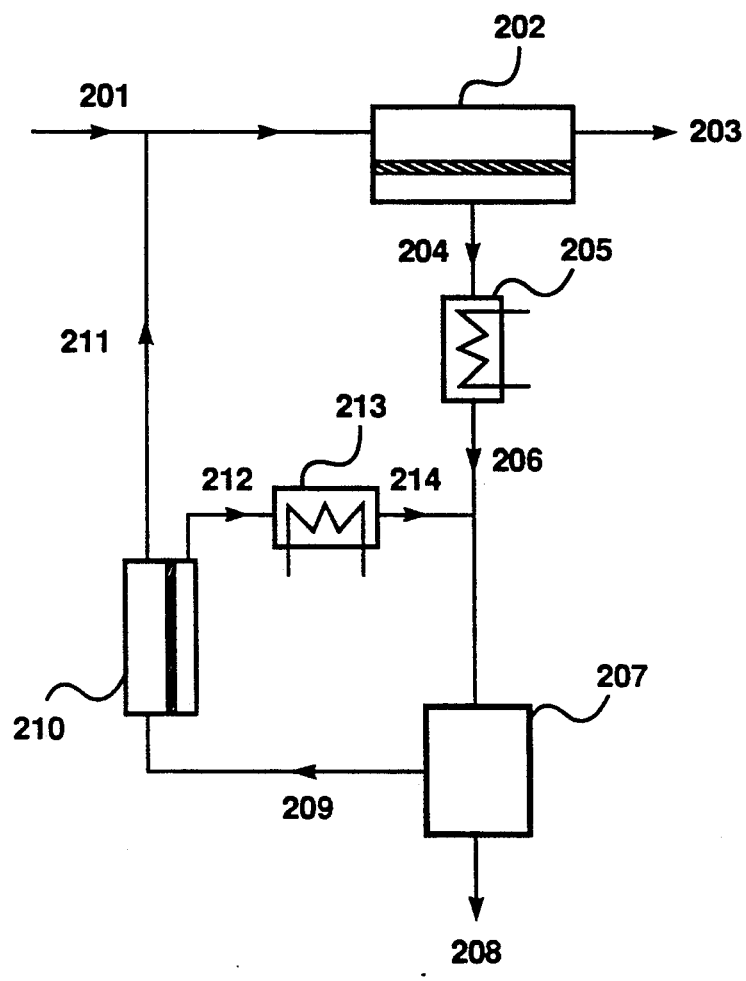
FIG. 4 is a schematic drawing showing a pervaporation/purification process carried out with a system including a main pervaporation unit, a condenser, a recovery or further purification unit, an auxiliary membrane module or modules and a second condenser.

FIGS. 3 and 4 show embodiments of the invention as it relates to pervaporation. A convenient mathematical method of describing pervaporation is to divide the separation into two steps. The first is evaporation of the feed liquid to form a hypothetical saturated vapor phase on the feed side of the membrane. The second is permeation of this vapor through the membrane to the low pressure permeate side of the membrane. Although no evaporation actually takes place on the feed side of the membrane during pervaporation, this approach is mathematically simple and is thermodynamically completely equivalent to the physical process.

In pervaporation, transmembrane permeation is induced by maintaining the vapor pressure on the permeate side lower than the vapor pressure of the feed liquid. The permeate side vapor pressure can be reduced, for example, by drawing a vacuum on the permeate side of the membrane, by sweeping the permeate side to continuously remove permeating vapor, or by cooling the permeate vapor stream to induce condensation. The feed solution may also be heated to raise the vapor pressure on the feed side.

FIG. 3 shows a pervaporation embodiment that corresponds to the gas separation embodiment of FIG. 1. The pervaporation system of FIG. 3 differs from the gas separation design of FIG. 1 in that the condenser provides a driving force for transmembrane permeation and the recovery or further purification is provided by a decanter, distillation column, adsorbent bed, extraction process or the like. Referring now to FIG. 3, a solution, 101, containing a component to be separated, passes to a pervaporation unit, 102, containing one or more membranes. Preferably, although not essentially, solution 101 is warmed before entering the pervaporation unit to raise the vapor pressure on the feed side and augment the driving force provided by the condenser. The pervaporation step normally involves running the feed solution across a membrane that is selectively permeable to the component that is to be removed. That component is concentrated in the vapor stream, 104, permeating the membrane; the residue, non-permeating, stream, 103, is correspondingly depleted in the component.

As with the gas separation designs, the membrane may take any of the membrane forms known in the art. For pervaporation, composite membranes, asymmetric membranes or ion-exchange membranes are preferred. Any convenient type of module may be used.

In FIG. 3, the driving force for transmembrane permeation is provided by condenser, 105, which liquefies the permeating vapor and thereby maintains a low partial pressure on the permeate side. Liquid stream, 106, from the condenser passes to the recovery, second separation or further purification unit, 107. A variety of techniques can be used to further purify the condensed permeate. If the content of the permeate and the mutual solubilities of the components are appropriate, the permeate may form two phases, for example an aqueous phase and an organic phase. Further purification could then be achieved by separating the two phases in a decanter. If the permeate forms a single phase, it can be further separated by distillation, adsorption or solvent extraction, for example. In FIG. 3, stream 108 represents the stream rich in the desired component; stream 109 represents the residual, non-product stream. For example, if the purpose of the pervaporation/further purification process were to separate an organic compound from water, stream 108 would be the organic-rich stream and stream 109 would be the residual aqueous stream. As in the gas separation applications described above, the composition of stream 109 may be very different from that of incoming feed stream 101. Stream 109 may be saturated with organic, for example.

The non-product stream, 109, is passed through an auxiliary pervaporation module or modules, 110. Preferably, before entering the module, stream 109 is heated to increase the feed side vapor pressure. This may be done by running stream 109 through a heat exchanger in heat-exchanging contact with, for example, stream 103. The auxiliary module, 110, is connected on its permeate side upstream of the condenser, 105. Thus a driving force for auxiliary membrane permeation is provided by the condenser. The concentrated vapor stream, 112, from the auxiliary module passes, together with stream 104 or separately, through the condenser and the further purification process. The residue stream, 111, from the auxiliary unit is recirculated to the feed side of the main membrane unit. The composition of stream 111 depends on the membrane area contained in the auxiliary module. Preferably, the membrane area is such that there is not a big difference between the compositions of streams 111 and 101. Most preferably, stream 111 should have a concentration about the same as stream 101.

In addition to the basic elements shown in FIG. 3, a pervaporation system commonly includes a small vacuum pump, on the permeate side, to remove any noncondensable gas that may be present in the system. The system may also include a pump to pump the condensed permeate to the recovery or further purification unit, 107, and a pump to pump the non-product stream from the recovery unit to the auxiliary module or modules.

An alternative embodiment of the invention as it relates to pervaporation is shown in FIG. 4. The pervaporation system of FIG. 4 differs from that of FIG. 3 in that a separate condenser is used to drive the auxiliary modules, but the recovery or further purification unit handles the condensates from both condensers. Other optional equipment, such as pumps to remove noncondensable gas and to supply liquid to the recovery unit may serve both condensers. Less desirably, separate pumps may be provided to handle each condenser.

Referring now to FIG. 4, a solution, 201, containing a component to be separated, passes to a pervaporation unit, 202, containing one or more membranes. The pervaporation step normally involves running the feed solution across a membrane that is selectively permeable to the component that is to be removed. That component is concentrated in the vapor stream, 204, permeating the membrane; the residue, non-permeating, stream, 203, is correspondingly depleted in the component. As with the embodiment of FIG. 3, the solution may be heated before entering the pervaporation unit.

The membranes and modules may be chosen and configured according to the same teachings as given for the FIG. 3 embodiment. A driving force for transmembrane permeation is provided by condenser, 205, which liquefies the permeating vapor and thereby maintains a low partial pressure on the permeate side. Liquid stream, 206, from the condenser passes to the recovery or further purification unit, 207, which, as in FIG. 3, may be a decanter, distillation column, etc. Stream 208 represents the stream rich in the desired component; stream 209 represents the non-product stream. Stream 209 is passed through an auxiliary pervaporation module or modules, 210. Preferably, before entering the module, stream 209 is heated to increase the feed side vapor pressure. This may be done by running stream 209 through a heat exchanger in heat-exchanging contact with, for example, stream 203. The auxiliary module, 210, is connected on its permeate side to auxiliary condenser, 213. The concentrated vapor stream, 212, from the auxiliary module passes through condenser, 213, emerging as liquid stream, 214, which in turn passes, together with stream 206 or separately, to the recovery or further purification unit, 207. The residue stream, 211, from the auxiliary unit is recirculated to the feed side of the main membrane unit. The design of FIG. 4 is particularly useful when the feed liquid contains three components of differing physical properties, such as a hydrophobic organic compound, an organic compound moderately soluble in water, and water.

FIGS. 3 and 4 show a one-stage pervaporation unit. However, it will be apparent that the same principle can be applied where the main pervaporation unit includes multiple membrane stages or steps, such as a two-step system, a two-stage system or other combinations.

FIGS. 3 and 4 show systems and processes in which a driving means for transmembrane permeation, equivalent to the pressure-changing means of the vapor separation embodiments, is provided by the condenser on the permeate side of the pervaporation unit, optionally augmented by heating the feed stream. Embodiments in which the driving force is provided by a vacuum pump instead of a condenser on the permeate side, a vacuum pump combined with a condenser, an eductor or any other means that would cause transmembrane permeation to occur are also within the scope of the invention.

Embodiments without a Recovery Unit

Figure 5:
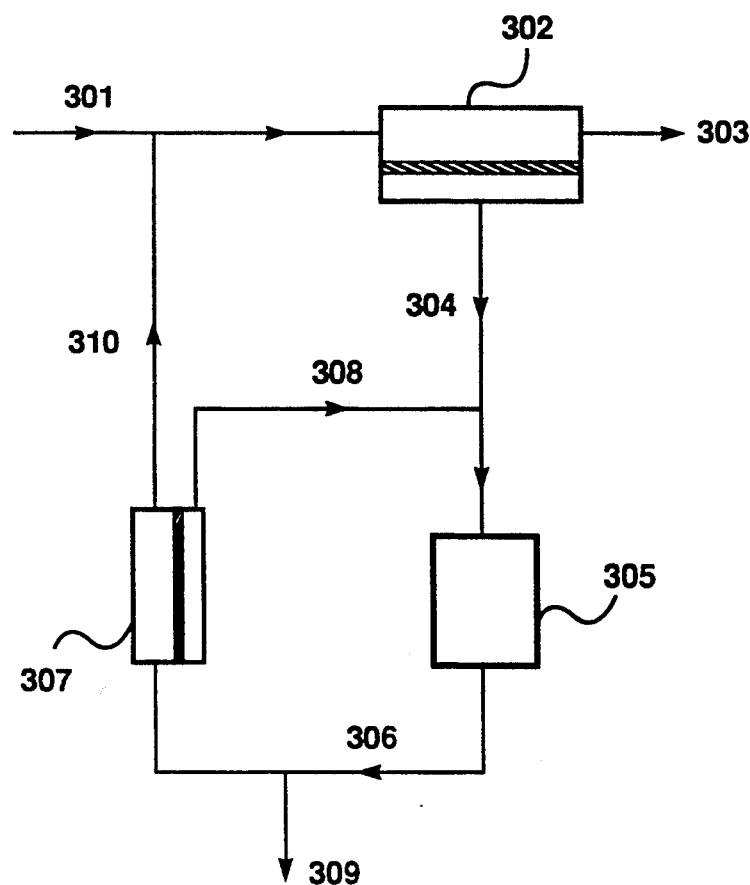
FIG. 5 is a schematic drawing showing a membrane separation process carried out with a system including a main membrane unit, a driving unit and an auxiliary membrane module or modules.

FIGS. 1–4 relate to embodiments in which a recovery unit of some type is used. Embodiments of the invention in which there is no discrete recovery unit included in the loop containing the auxiliary modules are possible. FIG. 5 shows such an embodiment. Referring now to this figure, a fluid, 301, which may be gas or liquid, containing a component to be separated, passes to a membrane separation unit, 302, containing one or more membranes. The membrane separation step normally involves running the feed fluid across a membrane that is selectively permeable to the component that is to be removed. That component is concentrated in the membrane permeate stream, 304; the residue, non-permeating stream, 303, is correspondingly depleted in the component.

As with the designs previously described, the membrane may take any form, including composite membranes, asymmetric membranes, ion-exchange membranes, facilitated or coupled transport membranes, etc. Likewise, the form of the module containing the membrane may be any appropriate form, such as plate-and-frame, potted fiber or spiral-wound.

The driving force for transmembrane permeation is provided by a driving unit, 305. In the case where the fluid to be treated is a gas, the driving unit is most commonly a vacuum pump that creates a pressure drop across the main membrane unit by drawing a partial vacuum on the permeate side of the membrane. As in the vapor separation embodiments described above, the driving unit could also be any other type of pump, such as a compressor, eductor or the like, that changes the pressure of the gas passing through it and draws gas away from the permeate side of the membrane. In the case where the fluid to be treated is a liquid, the driving unit is most commonly a condenser, as in the pervaporation embodiments above, but could also be a vacuum pump, eductor, etc.

The permeate stream, 304 is drawn through the driving unit, 305 and emerges as exit stream, 306. Stream 306 is passed thrrough an auxiliary membrane unit, 307, which, like the main membrane separation unit, normally contains membrane selective to the component to be separated. The volume of the permeate stream from the main membrane unit is usually much smaller than the feed volume, so the membrane area in the auxiliary unit is usually small compared with the main unit, unless a different type of membrane is used. The auxiliary unit is connected on its permeate side upstream of the driving unit. Thus a driving force for auxiliary membrane permeation is provided by the pump or other means that drives the main membrane unit. The auxiliary module(s) concentrate the permeate stream from the main unit to produce a further enriched permeate stream, 308. This enriched stream is passed back to the inlet side of the driving unit and mixes with the permeate stream, 304, from the main membrane unit, so that stream, 306 has a composition that reflects the combined compositions of the two permeate streams. When the process is first started up, the composition of stream 306 does not differ substantially from that of stream 304; the concentration in stream 306 of the component to be separated is relatively low. Cycling of fluid through the closed loop formed by the auxiliary modules and the driving means builds up the concentration, as stream 308 becomes progressively more concentrated. When the point is reached at which stream 306 has the desired composition, product is withdrawn from the loop as stream 309. FIG. 5 shows the product stream 309 being withdrawn in the portion of the loop after the driving unit and before the auxiliary modules. It will be apparent to those of skill in art that it would also be possible to withdraw the product stream from line 308, the permeate line from the auxiliary modules back to the driving unit.

The composition of residue stream, 310, from the auxiliary unit can be varied by varying the membrane area contained in the auxiliary module(s). In FIG. 5, the residue stream, 310, from the auxiliary unit is recirculated to the feed side of the main membrane unit. Such as arrangement is convenient, but not mandatory. As in the embodiments discussed above, designs in which the residue stream is not recirculated, but passes to some other destination, will find many useful applications and are contemplated within the scope of the invention. If stream 310 is recirculated, it may be preferable that the membrane area is such that there is not a big difference between the compositions of streams 301 and 310 and most preferably, that stream 310 should have a concentration about the same as stream 301. If the goal of the process is to maximize the concentration of stream 309, however, it may be preferable to size the auxiliary membrane unit to keep the concentration of stream 310 low, such as well below the concentration of stream 301. This arrangement maximizes the retention of the component to be separated in the recycle loop formed by the auxiliary unit and enables the concentration of stream 309 to reach a high value.

The membranes used in the main membrane unit and the auxiliary modules may be of the same type or different. For example, where an organic compound is to be separated from air, both units may contain silicone rubber membranes. Optionally, although both units may contain membranes selective to the component that is to be separated, the selectivities of the membranes may be different. For example, the main membrane unit, which has to process the bulk of the feed fluid, may contain membranes of high flux and moderate selectivity. The auxiliary membrane unit, which usually deals with a small feed stream, may contain membranes of high selectivity but lower flux. Useful embodiments are also possible using membranes of unlike selectivities in the main unit and the auxiliary modules.

Process of the type shown in FIG. 5 are especially useful in gas separation and pervaporation applications. The arrangement of FIG. 5 can achieve substantial improvements in performance and efficiency compared with a conventional one-stage membrane separation system. Frequently, a separation can be performed with the arrangement of FIG. 5 using about half as much energy and about half as much membrane area as would be needed to achieve the same separation with a conventional system design. In some cases, the arrangement of FIG. 5 can match the performance of a conventional two-stage system. This is particularly advantageous in situations where the use of two full sets of ancillary equipment, such as pumps, compressors, condensers, valves, flowmeters, heat exchangers, etc. is unattractive for cost, safety, reliability or other considerations.

Another particular advantage of the arrangement of FIG. 5 is that a separate recovery unit, although not precluded, is not required, because the auxiliary unit can be used to build up the concentration of the product stream to a target level. Applications where the invention in this form is particularly useful are in gas separation and pervaporation. Pervaporation can be used to dehydrate organic solutions, to remove organic compounds from water or to separate mixtures of organics. If the components to be separated are of very different properties, such as benzene and water, and if reasonably selective membranes are available, then a conventional membrane system will often be able to provide a good enough treatment to recover separate organic and aqueous phases by decantation. If the components have a high mutual solubility or miscibility, such as acetone and water, or form an azeotrope, such as toluene/octane or many other organic mixtures, then a one-phase product stream results. Furthermore, unless the separation factor is high, the product composition may still be near the azeotrope and further separation by distillation may still be difficult. The process of the invention provides an attractive method for obtaining a relatively good separation from a relatively unselective membrane by cycling the product in the auxiliary loop until it has reached a target concentration.

The extent of extra enrichment that can be obtained in the auxiliary loop can be calculated from the mass balance for the loop. Thus:

$$V_{304} \cdot C_{304} - V_{310} \cdot C_{310} = V_{309} \cdot C_{309} \quad (1)$$

where V and C are the volumes per unit time and concentrations of the respective streams. The enrichment in concentration of stream 309 compared to stream 304 is given by the expression:

$$\frac{C_{309}}{C_{304}} = \frac{V_{304}}{V_{309}} - \frac{(V_{304} - V_{309}) \cdot C_{310}}{C_{304} \cdot V_{309}} \quad (2)$$

The concentration $C_{310}$ will depend on the size and efficiency of the auxiliary membrane unit 307. If the unit is sized to provide a concentration $C_{310}$ that is low, such as 20% or less, compared with the concentration of stream 304, then the second term in the equation is small and $$\frac{C_{309}}{C_{304}} \approx \frac{V_{304}}{V_{309}} \quad (3)$$

is a good approximation.

In this case, the concentration of the product stream, 309, is inversely proportional to its volume. The smaller is the volume flow of the stream that is drawn off, the higher is the concentration, and vice versa. This is a useful relationship that can be employed to maintain the concentration $C_{309}$ at a chosen value. For example, if the composition of the raw feed stream, 301, changes, then this will affect the composition of stream 304, which will in turn affect the composition of streams 306, 308 and 309. If maintaining a target composition for stream 309 is important, this can be achieved by reducing or increasing its flow rate.

The process of the invention is able to attain a significant enrichment of the product compared with the enrichment that would be achieved by a conventional single-stage system. In other words, stream 309 is significantly enriched compared with stream 304. Preferably, stream 309 has twice the concentration of the preferentially removed component compared with stream 304, and most preferably five times or more the more the concentration of the preferentially removed component compared with stream 304. The volume flow of stream 309 is corresponding small compared with the volume flow of stream 304, such as 50% of stream 304, or 20% of stream 304 or less.

The systems and processes of the invention could be used for diverse applications, including:

1. Separation of oxygen or nitrogen from air.
2. Separation of hydrogen from nitrogen, methane, carbon monoxide or other gases.
3. Separation of carbon dioxide from nitrogen or other gases in natural gas and oil drilling applications.
4. Sour gas sweetening.
5. Other natural gas processing: Btu control, dewpoint control, NGL recovery, etc.
6. Removal of acid gases from industrial air emissions.
7. Other air pollution control applications, e.g. removal of hydrocarbons, chlorinated hydrocarbons, CFCs, carcinogens from industrial air emissions.
8. Dehydration of many types of gas stream.
9. Separation of closely boiling mixtures or azeotropes.
10. Dehydration of organic liquids.
11. Clean-up of groundwater contamination.
12. Removal of contaminants from industrial wastewater.
13. Other water purification.
14. Treatment of industrial process streams containing alcohols, acetone, phenols, other moderately water-soluble or miscible compounds.

The invention is now further illustrated by the following examples, which are intended to be illustrative of the invention, but are not intended to limit the scope or underlying principles in any way.

EXAMPLES

All of the examples compare the performance of different types of membrane arrangement. The examples are computer calculations, performed using computer modeling programs created by Membrane Technology and Research, Inc., and based in part on the gas permeation equations for cross-flow conditions described by Shindo et al., "Calculation Methods for Multicomponent Gas Separation by Permeation," *Sep. Sci. Technol.* 20, 445-459 (1985).

The examples are in three groups, A, B and C. The first group concerns treatment of a gas stream containing CFC-11; the second a gas stream containing carbon dioxide, and the third a solution of acetone in water. In each case, target values for the membrane residue stream and the product stream were set and a comparison was made of the energy requirements and membrane area needed to reach the target with different membrane arrangements.

GROUP A EXAMPLES

The calculations described above were performed using the following assumptions:

| Feed gas composition: | 1% CFC-11 in air |
|---|---|
| Feed pressure: | 15 psia |
| Feed flow rate: | 100 scfm |
| Membrane selectivity: | 25 |
| Residue CFC concentration: | 0.1% |
| Permeate pressure: | 1 psia |
| Product stream CFC concentration: | Variable from 10% to 60% |

EXAMPLE 1 (not in accordance with the invention)

Single-stage Membrane Separation Unit with Recycle of the Membrane Permeate Stream to the Feed Side of the Membrane Unit The computer calculations were performed for a one-stage system in which the permeate stream is cycled back to the feed side of the membrane, forming a loop. Gas cycles through the loop until the desired product concentration has been reached. The loop is then tapped to yield a product stream of CFC concentration varying from 10% to 50%. The permeate pump capacity and membrane area for each product concentration are shown in Table 1.

TABLE 1

| Pump capacity (hp) | Membrane area ($m^2$) | Product conc. (%) |
|---|---|---|
| 43.5 | 372 | 10 |
| 64.5 | 494 | 20 |
| 83.0 | 561 | 30 |
| 104.5 | 611 | 40 |
| 133.5 | 658 | 50 |

EXAMPLE 2

Single-stage Membrane Separation Unit with Auxiliary Modules

The calculations described in Example 1 were repeated using a system design as in FIG. 5. The CFC concentration in stream 310 was set at 1% to match the incoming feed 301. The calculated membrane areas and pump capacities required to achieve the desired performance are listed in Table 2.

TABLE 2

| Pump capacity (hp) | Membrane area ($m^2$) | | | Product conc. (%) |
|---|---|---|---|---|
| | First stage | Aux. module | Total | |
| 27.9 | 220 | 40 | 260 | 10 |
| 34.5 | 235 | 60 | 295 | 20 |
| 39.9 | 230 | 80 | 310 | 30 |
| 47.6 | 230 | 100 | 330 | 40 |

TABLE 2-continued

| Pump capacity (hp) | Membrane area (m²) | | | Product conc. (%) |
|---|---|---|---|---|
| | First stage | Aux. module | Total | |
| 57.1 | 225 | 120 | 345 | 50 |

EXAMPLE 3 (NOT IN ACCORDANCE WITH THE INVENTION)

Two-stage Membrane Separation Unit

The computer calculations were performed for a two-stage system in which the residue stream from the second stage is recycled to the feed side of the first stage and the permeate from the second stage forms the product stream. Calculations were performed for product streams varying in concentration from 10% to 61%. The permeate pump capacity and membrane area for each product concentration is shown in Table 3.

TABLE 3

| Pump capacity (hp) | | | Membrane area (m²) | | | Product conc. (%) |
|---|---|---|---|---|---|---|
| First pump | Second pump | Total | First stage | Second stage | Total | |
| 21.1 | 7.3 | 28.4 | 203 | 67 | 270 | 10 |
| 24.4 | 3.4 | 27.8 | 235 | 30 | 265 | 20 |
| 28.1 | 2.1 | 30.2 | 270 | 17 | 287 | 30 |
| 32.4 | 1.6 | 34.0 | 310 | 11 | 321 | 40 |
| 6.8 | 1.2 | 38.0 | 350 | 8 | 358 | 50 |
| 40.9 | 1.0 | 41.9 | 385 | 5 | 390 | 61 |

EXAMPLE 4

Comparison of Examples 1, 2 and 3; 20% Product Concentration

The data calculated for Examples 1, 2 and 3 above were compared. In particular, we considered the pump capacity and membrane area requirements for the three system designs to achieve a CFC concentration of 20% in the product stream. The comparison is shown in Table 4.

TABLE 4

| Membrane Arrangement | Total Pump Capacity (hp) | Total Membrane Area (m²) |
|---|---|---|
| One-stage with recycle | 64.5 | 494 |
| One-stage with aux. modules | 34.5 | 295 |
| Two-stage | 27.8 | 265 |

This table shows that the design of the invention uses only 53% of the energy and 60% of the membrane area of the one-stage design. The design of the invention uses 11% more membrane area and 24% more energy than the two-stage design. The energy requirement is, however, provided by a single 35 hp pump, rather than two pumps, one of which is extremely small, as in the two-stage design (3.4 hp, Table 3).

EXAMPLE 5

Comparison of Examples 1, 2 and 3; 50% Product Concentration

The data calculated for Examples 1, 2 and 3 above were compared. In particular, we considered the pump capacity and membrane area requirements for the three system designs to achieve a CFC concentration of 50% in the product stream. The comparison is shown in Table 5.

TABLE 5

| Membrane Arrangement | Total Pump Capacity (hp) | Total Membrane Area (m²) |
|---|---|---|
| One-stage with recycle | 133.5 | 658 |
| One-stage with aux. modules | 57.1 | 345 |
| Two-stage | 38.0 | 358 |

This table shows that the design of the invention uses only 43% of the energy and 52% of the membrane area of the one-stage design. The design of the invention uses 96% of the membrane area and 50% more energy than the two-stage design. The energy requirement is, however, provided by a single 35 hp pump, rather than two pumps, one of which is extremely small (1.2 hp, Table 3).

GROUP B EXAMPLES

The calculations described above were performed using the following assumptions:

| | |
|---|---|
| Feed gas composition: | 0.5% carbon dioxide in nitrogen |
| Feed pressure: | 15 psia |
| Feed flow rate: | 100 scfm |
| Membrane selectivity: | 10 (silicone rubber) |
| Residue $CO_2$ concentration: | 0.1% |
| Permeate pressure: | 1 psia |
| Product stream $CO_2$ concentration: | Variable from 5% to 15% |

EXAMPLE 6 (NOT IN ACCORDANCE WITH THE INVENTION)

Single-stage Membrane Separation Unit with Recycle of the Membrane Permeate Stream to the Feed Side of the Membrane Unit The computer calculations were performed for a one-stage system in which the permeate stream is cycled back to the feed side of the membrane, forming a loop. Gas cycles through the loop until the desired product concentration has been reached. The loop is then tapped to yield a product stream of carbon dioxide concentration varying from 5% to 15%. The permeate pump capacity and membrane area for each product concentration is shown in Table 6.

TABLE 6

| Pump capacity (hp) | Membrane area (m²) | Product conc. (%) |
|---|---|---|
| 62.3 | 600 | 5 |
| 89.7 | 850 | 10 |
| 107.9 | 1,000 | 15 |

EXAMPLE 7

Single-stage Membrane Separation Unit with Auxiliary Modules

The calculations described in Example 6 were repeated using a system design as in FIG. 5. The $CO_2$ concentration in stream 310 was set at 0.5% to match the incoming feed 301. The calculated membrane areas and pump capacities required to achieve the desired performance are listed in Table 7.

TABLE 7

| Pump capacity (hp) | Membrane area (m²) | | | Product conc. (%) |
| --- | --- | --- | --- | --- |
| | First stage | Aux. module | Total | |
| 40.6 | 290 | 100 | 390 | 5 |
| 50.1 | 290 | 180 | 470 | 10 |
| 57.1 | 290 | 230 | 520 | 15 |

EXAMPLE 8 (NOT IN ACCORDANCE WITH THE INVENTION)

Single-stage Membrane Separation Unit with Recycle of the Membrane Permeate Stream to the Feed Side of the Membrane Unit The computer calculations of Example 6 were repeated using a more selective ($\alpha=40$), but lower flux membrane made from Pebax, a polyamide-polyether block copolymer. The results are shown in Table 8.

TABLE 8

| Pump capacity (hp) | Membrane area (m²) | Product conc. (%) |
| --- | --- | --- |
| 20.2 | 3,100 | 5 |
| 29.9 | 4,500 | 10 |
| 36.3 | 5,300 | 15 |

Comparing Tables 8 and 6, it may be seen that a lesser driving force but much greater membrane area is required if the higher selectivity Pebax membrane is used.

EXAMPLE 9

Single-stage Membrane Separation Unit with Auxiliary Modules

The calculations described in Example 7 were repeated using a more selective ($\alpha=40$), but lower flux membrane made from Pebax, a polyamide-polyether block copolymer. The results are shown in Table 9.

TABLE 9

| Pump capacity (hp) | Membrane area (m²) | | | Product conc. (%) |
| --- | --- | --- | --- | --- |
| | First stage | Aux. module | Total | |
| 15.7 | 1,900 | 500 | 2,400 | 5 |
| 17.5 | 2,000 | 600 | 2,600 | 10 |
| 19.2 | 2,000 | 750 | 2,760 | 15 |

Comparing Tables 9 and 7, it may be seen that a lesser driving force but a much greater membrane area is required if the higher selectivity Pebax membrane is used.

EXAMPLE 10

Single-stage Membrane Separation Unit with Auxiliary Modules

The calculations described in Examples 7 and 9 were repeated using the silicone rubber membrane for the main membrane unit and the Pebax membrane for the auxiliary modules. The results are shown in Table 10.

TABLE 10

| Pump capacity (hp) | Membrane area (m²) | | | Product conc. (%) |
| --- | --- | --- | --- | --- |
| | First stage | Aux. module | Total | |
| 34.0 | 290 | 550 | 840 | 5 |
| 38.2 | 290 | 1,000 | 1,290 | 10 |

TABLE 10-continued

| Pump capacity (hp) | Membrane area (m²) | | | Product conc. (%) |
| --- | --- | --- | --- | --- |
| | First stage | Aux. module | Total | |
| 40.4 | 290 | 1,100 | 1,390 | 15 |

Comparing Tables 7, 9 and 10, it may be seen that mixing the membranes provides a system with intermediate energy consumption and membrane area requirement.

EXAMPLE 11

Comparison of Examples 6–10; 10% Product Concentration

The data calculated for Examples 6–10 above were compared. In particular, we considered the pump capacity and membrane area requirements for the three system designs to achieve a carbon dioxide concentration of 10% in the product stream. The comparison is shown in Table 11.

TABLE 11

| Membrane Arrangement | Total Pump Capacity (hp) | Total Membrane Area (m²) |
| --- | --- | --- |
| One-stage with recycle (silicone rubber) | 90 | 850 |
| One-stage with aux. modules (silicone rubber) | 50 | 470 |
| One-stage with recycle (Pebax) | 30 | 4,500 |
| One-stage with aux. modules (Pebax) | 18 | 2,600 |
| One-stage with aux. modules (mixed membranes) | 38 | 1,290 |

This table shows that the design of the invention uses only 56% of the energy and 55% of the membrane area of the one-stage design when silicone rubber membranes are used in both membrane units. The design of the invention uses 60% of the energy and 58% of the membrane area of the one-stage design when Pebax membranes are used in both membrane units. When mixed membranes are used, the design uses only 42% of the energy of the one-stage silicone rubber design and only 29% of the membrane area of the Pebax design. The invention provides considerable flexibility for tailoring the membrane and energy usage to meet a specific set of circumstances.

GROUP C EXAMPLES

The calculations described above were performed using the following assumptions:

| | |
| --- | --- |
| Feed liquid composition: | 0.5% acetone in water |
| Feed temperature: | 60° C. |
| Feed flow rate: | 10 L/min |
| Membrane separation factor: | 30 |
| Residue acetone concentration: | 0.05% |
| Condenser temperature: | 10° C. |
| Product stream acetone concentration: | Variable from 10% to 30% |

EXAMPLE 12 (NOT IN ACCORDANCE WITH THE INVENTION)

Single-stage Membrane Separation Unit with Recycle of the Membrane Permeate Stream to the Feed Side of the Membrane Unit The computer calculations were performed for a one-stage system in which the permeate stream is cycled back to the feed side of the membrane, forming a loop. Liquid cycles through the loop until the desired product concentration has been reached. The loop is then tapped to yield a product stream of acetone concentration varying from 10% to 30%. The cooling that must be provided by the condenser and the membrane area for each product concentration are shown in Table 12.

TABLE 12

| Cooling capacity (kW) | Membrane area ($m^2$) | Product conc. (%) |
|---|---|---|
| 41 | 65 | 10 |
| 55 | 85 | 20 |
| 69 | 102 | 30 |

EXAMPLE 13

Single-stage Membrane Separation Unit with Auxiliary Modules

The calculations described in Example 12 were repeated using a system design as in FIG. 5. The acetone concentration in stream 310 was set at 0.5% to match the incoming feed 301. The calculated membrane areas and cooling capacities required to achieve the desired performance are listed in Table 13.

TABLE 13

| Cooling capacity (kW) | Membrane area ($m^2$) First stage | Membrane area ($m^2$) Aux. module | Membrane area ($m^2$) Total | Product conc. (%) |
|---|---|---|---|---|
| 29 | 45 | 5 | 50 | 10 |
| 30 | 45 | 7 | 52 | 20 |
| 31 | 45 | 8 | 53 | 30 |

EXAMPLE 14 (NOT IN ACCORDANCE WITH THE INVENTION)

Two-stage Membrane Separation Unit

The computer calculations were performed for a two-stage system in which the residue stream from the second stage is recycled to the feed side of the first stage and the permeate from the second stage forms the product stream. Calculations were performed only for product streams of 30% concentration, the lower end of the range at which a two-stage system would be needed. The results are shown in Table 14.

TABLE 14

| Cooling capacity (kW) | Membrane area ($m^2$) First stage | Membrane area ($m^2$) Second stage | Membrane area ($m^2$) Total | Product conc. (%) |
|---|---|---|---|---|
| 31 | 45 | 7 | 52 | 30 |

EXAMPLE 15

Comparison of Examples 12-14; 30% Product Concentration

The data calculated for Examples 12-14 above were compared. In particular, we considered the cooling capacity and membrane area requirements for the three system designs to achieve an acetone concentration of 30% in the product stream. The comparison is shown in Table 15.

TABLE 15

| Membrane Arrangement | Cooling Capacity (kW) | Total Membrane Area ($m^2$) |
|---|---|---|
| One-stage with recycle | 69 | 102 |
| One-stage with aux. modules | 31 | 53 |
| Two-stage | 31 | 52 |

This table shows that the design of the invention uses only 45% of the cooling capacity and 52% of the membrane area of the one-stage design. In this particular case, the energy and membrane usage of the design of the invention and a two-stage design are essentially the same. The design of the invention is simpler and uses fewer components, however.

We claim:

1. A method for increasing efficiency in a membrane separation system for removing a component from a fluid stream by gas separation, vapor separation or pervaporation, said system including in series a membrane separation unit and a driving means for transmembrane permeation, said method comprising:
    (a) connecting a permselective membrane to said system in such a way that a driving force for permeation of said permselective membrane is provided by said driving means;
    (b) passing an exit stream from said driving means across said permselective membrane, thereby producing a depleted stream depleted in said component compared with said exit stream and an enriched stream enriched in said component compared with said exit stream;
    (c) passing said enriched stream to an inlet side of said driving means, thereby mixing said enriched stream with a permeate stream from said membrane separation unit;
    (d) continuing steps (b) and (c) at least until said exit stream has a desired concentration;
    (e) withdrawing at least a portion of said exit stream at said desired concentration as a product stream.

2. The method of claim one, wherein said driving means for transmembrane permeation comprises a pump.

3. The method of claim one, wherein said driving means for transmembrane permeation comprises a condenser.

4. The method of claim one, wherein said driving means for transmembrane permeation comprises an eductor.

5. The method of claim one, wherein said fluid is a gas.

6. The method of claim one, wherein said fluid is a liquid.

7. The method of claim one, further comprising:
    (f) recirculating said depleted stream to join said fluid stream.

8. The method of claim 1, wherein said product stream has a concentration of said component at least five times greater than said permeate stream.

9. The method of claim 1, wherein said product stream has a fixed concentration and a variable flow rate.

10. A membrane separation process for removing a component from a fluid stream by gas separation, vapor separation or pervaporation, said process comprising:
(a) providing a membrane separation system comprising a membrane separation unit and a driving means for transmembrane permeation;
(b) passing a fluid stream containing a component through said membrane separation unit;
(c) withdrawing from said driving means an exit stream enriched in said component compared with said fluid stream;
(d) passing said exit stream across a permselective membrane wherein a driving force for transmembrane permeation is provided by said driving means;
(e) withdrawing from said permselective membrane a depleted stream depleted in said component compared with said exit stream;
(f) withdrawing from said permselective membrane an enriched stream enriched in said component compared with said exit stream;
(g) passing said enriched stream to an inlet side of said driving means;
(h) continuing steps (b) through (g) at least until said exit stream has a desired concentration; and
(i) withdrawing at least a portion of said exit stream at said desired concentration as a product stream.

11. The method of claim 10, wherein said driving means for transmembrane permeation comprises a pump.

12. The method of claim 10, wherein said driving means for transmembrane permeation comprises a condenser.

13. The method of claim 10, wherein said driving means for transmembrane permeation comprises an eductor.

14. The method of claim 10, wherein said fluid is a gas.

15. The method of claim 10, wherein said fluid is a liquid.

16. The method of claim 10, further comprising:
(j) recirculating said depleted stream to join said fluid stream.

17. The method of claim 10, wherein said product stream has a concentration of said component at least five times greater than said permeate stream.

18. The method of claim 10, wherein said product stream has a fixed concentration and a variable flow rate.

19. Apparatus for separating a component from a fluid stream by gas separation, vapor separation or pervaporation, comprising:
(a) a membrane separation unit;
(b) a driving means for transmembrane permeation connected to an outlet from said membrane separation unit;
(c) a permselective membrane connected to said driving means in such a way that a driving force for permeation of said permselective membrane is provided by said driving means;
(d) means, positioned between said driving means and said permselective membrane, for withdrawing a product fluid stream, in such a way that the composition of said product fluid stream is essentially unchanged by said means.

20. The apparatus of claim 19, wherein said driving means for transmembrane permeation comprises a pump.

21. The apparatus of claim 19, wherein said driving means for transmembrane permeation comprises a vacuum pump.

22. The apparatus of claim 19, wherein said driving means for transmembrane permeation comprises a compressor.

23. The apparatus of claim 19, wherein said driving means for transmembrane permeation comprises a condenser.

24. The apparatus of claim 19, wherein said driving means for transmembrane permeation comprises an eductor.

* * * * *